Figure 9:
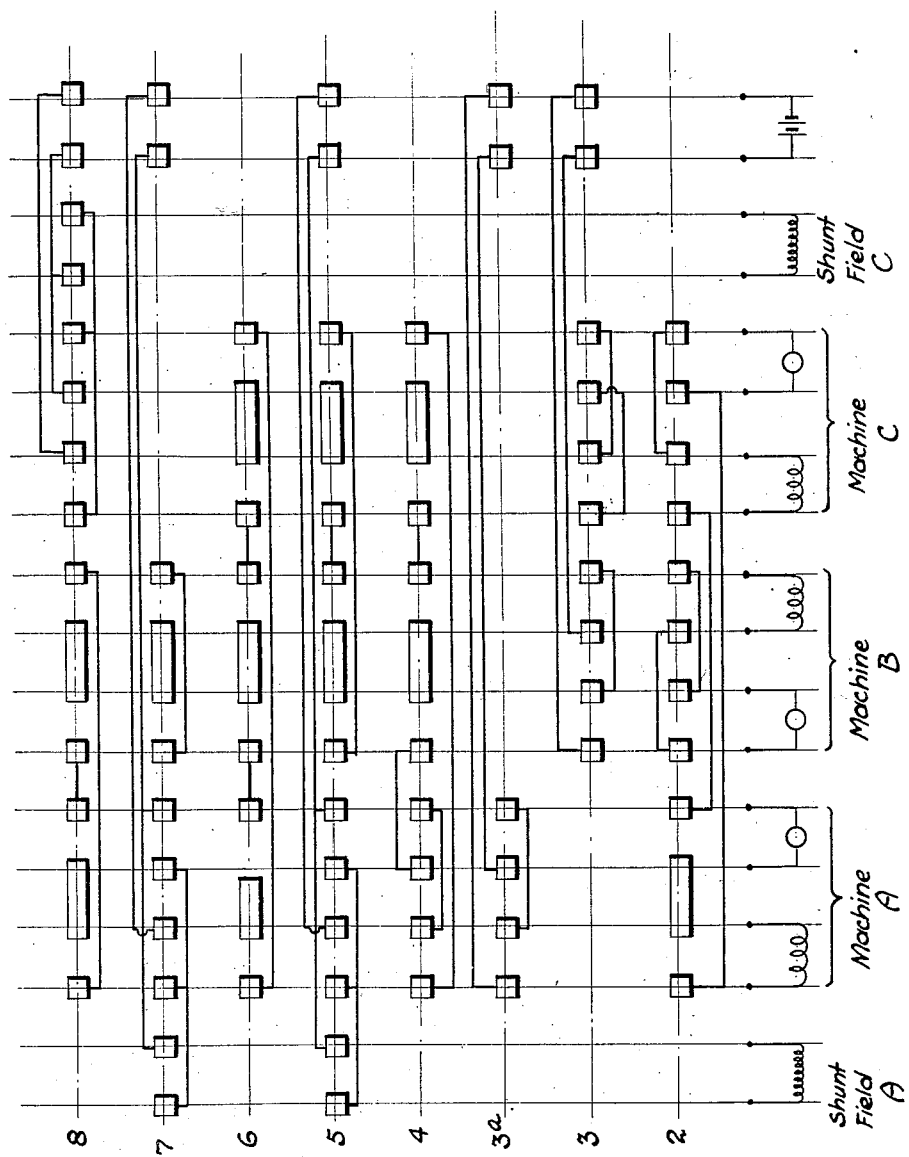

Nov. 3, 1925.                                                    1,559,945
                         J. B. ENTZ
                  POWER TRANSMISSION MECHANISM
                   Filed April 21, 1923      2 Sheets-Sheet 1
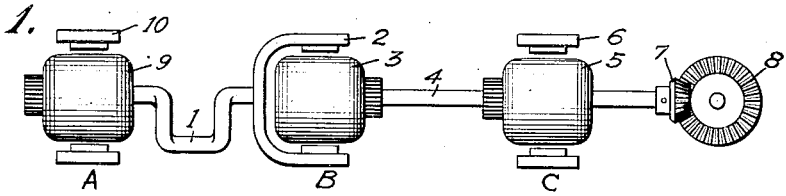
Fig. 2.
Reverse
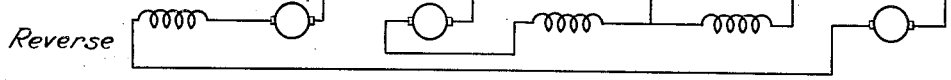
Fig. 3.
Crank &
Brake
Fig. 3ª
Crank
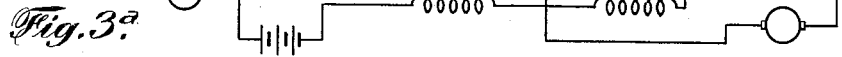
Fig. 4.
1st Position
Max. Torque
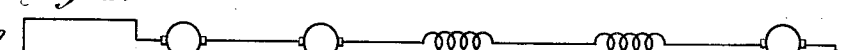
Fig. 5.
Multiplied
Torque
Fig. 6.
Intermediate
Multiplied
Torque.
Fig. 7.
Direct
Fig. 8.
Multiplied
Speed.
Inventor
Justus B. Entz
By his Attorney Nov. 3, 1925.

J. B. ENTZ 1,559,945

POWER TRANSMISSION MECHANISM

Filed April 21, 1923    2 Sheets-Sheet 2

Inventor
Justus B. Entz.
By Attorney

Patented Nov. 3, 1925.

1,559,945

UNITED STATES PATENT OFFICE.

JUSTUS B. ENTZ, OF NEW ROCHELLE, NEW YORK.

POWER-TRANSMISSION MECHANISM.

Application filed April 21, 1923. Serial No. 633,613.

*To all whom it may concern:*

Be it known that I, JUSTUS B. ENTZ, a citizen of the United States, residing in the city of New Rochelle and State of New York, have invented an Improvement in Power-Transmission Mechanism, of which the following is a specification.

My invention relates to means for transmitting power from a prime mover to a load, and is particularly adapted to the propulsion of vehicles using internal combustion engines as a prime mover, although my invention is not limited to this use and may be applied in many other connections in which it will be found useful.

More particularly, my invention relates to the general type of power transmitting mechanism disclosed in my United States Letters Patent No. 732,062, of June 30th, 1903; and No. 1,207,732 of December 12th 1916, and provides means whereby certain functions which are impossible of performance with the mechanisms of said prior patents may be performed and greatly enhances the efficiency of operation of the power transmission system. For instance, means are provided in the apparatus of my present invention, whereby reversal of the direction of movement of the vehicle or load may be secured, and the torque delivered to the load and the speed of the load may be multiplied to a greater extent, so that a very much wider variation of speed and torque may be secured than it has heretofore been possible to obtain, while at the same time the prime mover and the transmission mechanism is operated at a very much higher efficiency.

It has heretofore been proposed to reverse power transmission devices of the general character described, a means for obtaining such reversal being illustrated in my said Patent No. 732,062 and also in my United States Letters Patent No. 1,164,588 of December 14th, 1915 and Patent No. 829,827 issued E. H. Anderson on August 28th, 1906. A consideration of these patents, however, will show that three types of reversing means are illustrated:

1. A type of reversing means in which a dynamo electric machine having its armature fixed to the shaft and its field stationary is supplied with current from a storage battery or other external source and is driven as a motor, the machine having two movable elements being at that time ineffective.

2. A type of reversing means in which a clutch is interposed between the first and second machines and when it is desired to reverse the machines are declutched, the second machine being driven as a motor as in Type 1, but obtaining its current from the machine having two movable elements, the armature of the first machine being held stationary.

3. A type of reversing means in which the second machine is caused to overpower the first; that is, the reverse torque of the second machine overpowers the forward torque of the second machine, the net reversal torque delivered to the load being the difference between the two.

All of the methods outlined above the present serious difficulties from the commercial standpoint. It is evident that where the reversing motor obtains its power from a battery, a very large battery capacity must be provided and the battery may under certain conditions be subected to conditions of discharge, such as to seriously shorten its life. The use of a mechanical clutch between the two machines is open to the objection of complication of the system and introduces, particularly in the hands of an inexperienced operator, difficulties of operation which militate against it seriously. Where no clutch is used and the second machine overpowers the first, it is evident that only a relatively small reverse torque is available and such reverse torque is obtained at the expense of considerable losses in the units of the transmission.

In the apparatus of my present invention, I am enabled to secure a reversal of the direction of movement of the load without the interposition of a mechanical clutch and without using a battery as a source of current, while at the same time obtaining a reverse torque high enough for all requirements of service and operating the units of the transmission under conditions contributing to efficient operation.

It has also been proposed in the prior art, to increase the torque delivered by the prime mover to the load by using a portion of the electrical energy of the first machine to assist the prime mover in delivering torque to the load, as for instance in the Thompson Patent No. 808,263 of December 26, 1905, but in this case all of the power delivered to the load is delivered thereto through the clutch generator (i. e. the dynamo electric machine having two movable elements, one connected to the load and one to the prime mover).

As shown in my said Letters Patent No. 732,062 and in my later patents referred to above, the engine torque is transmitted through the clutch generator and means are provided for obtaining additional torque through the second machine, using said machine as a motor connected with the driving shaft. My present invention also provides means whereby the foregoing mode of operation may be obtained and at the same time provides means whereby the speed of the driven shaft may be increased above that of the prime mover by adding electrical energy to the clutch generator obtained from a generator driven by the prime mover. In this case, the engine torque is greater than the shaft torque and the clutch generator is used to transmit the shaft torque only. The apparatus of my invention, therefore, enables me to deliver increased torque at speeds lower than engine speeds or increased speeds at torques less than engine torques, and at the same time transmit through the clutch generator the lesser of the torques; i. e., the shaft torque, when the shaft torque is less than engine torque and the engine torque, when the shaft torque is greater than the engine torque, thus keeping the size of the apparatus at a minimum and its efficiency at a maximum.

My improved apparatus also provides a means for obtaining a torque at low vehicle speeds greatly in excess of the maximum torque which it has been possible to obtain from previous transmission mechanisms of the character described. Thus, generally speaking, in my said Letters Patent No. 732,062 and the Anderson Patent No. 829,827 the maximum torque is obtained by shunting the field of the clutch generator, using the second machine (that having one movable element only) at this time as a motor, to assist in driving the load, the engine torque being transmitted to the driving shaft through the clutch generator. In my present invention, I increase the torque on the driving shaft of the prime mover by connecting a motor therewith and transmitting the increased prime mover torque through the clutch generator to the driving shaft and adding thereto the torque of the motor on the driving shaft. The torque added by the motor to the driving shaft and the additional torque added to the prime mover over and above its own torque are derived from electrical energy taken from the slip of the clutch generator. The total torque on the driving shaft is thus supplied by the motor on the driving shaft and the torque transmitted by the clutch generator, the latter being the sum of the engine torque and the torque derived from the motor on the engine. In this way, it is possible to run the clutch generator with full strength of field instead of with weakened field, thus securing a greater torque per ampere from the clutch generator and decreasing the total current of the circuit, thus decreasing the size of the machine and the losses therein.

In the drawings, I have shown in:

Fig. 1, a diagrammatic representation of my improved power transmission apparatus; in Figs. 2, 3, 3ª, 4, 5, 6, 7 and 8, diagrams of connections indicating the manner in which the dynamo electric machines are connected to secure the several desired results. It will be understood that these connections may be combined with connections giving intermediate speeds or performing other functions, many of which are illustrated in the prior art and that I do not intend to confine myself to the particular connections of series of steps shown and Figure 9 illustrates a developed drum type controller having connections suitable for accomplishing the connections diagrammatically illustrated in Figures 2 to 8 inclusive, the dynamo electric machines involved in the apparatus being diagrammatically illustrated at one side of the controller, and the positions corresponding to the connections shown in Figures 2 to 8 inclusive being indicated by the dotted lines numbered in Figure 9 to correspond to said position.

In Fig. 1, I have shown diagrammatically, as illustrated by the crank shaft of a gas engine, a prime mover 1. The crank shaft of the prime mover carries one element, for instance, the field 2, of a dynamo electric machine, the other element of which, the armature 3, is mounted upon the drive shaft of the vehicle 4, or otherwise connected to the load. A second dynamo electric machine is provided, one element of which, say the armature 5, is mounted upon the driving shaft and the other element, say the field, 6, is stationary. The load in the diagram of Fig. 1 is illustrated as the driving pinion 7 and ring gear 8 of a motor car. Connected to the crank shaft 1 is a dynamo electric machine having one element, for instance, the armature 9, connected to the driving shaft and the other element, the field 10, stationary. For convenience, and because of the fact that the dynamo electric machines described sometimes function as generators and sometimes as motors, I have arbitrarily designated them in the drawings by the letters "A", "B" and "C", machine A being that having one stationary and one movable element and being connected to the crank shaft of the prime mover, machine B being that having two movable elements and machine C being that having one stationary and one movable element and being connected to the drive shaft.

I shall now describe the connections of the several diagrams, Figs. 2 to 8 in detail.

Fig. 2 shows a position for reversing the direction of the vehicle, in which case the machine A acts as a generator, taking power from the prime mover and machine C as an electric motor with armature and field coils connected to give opposite direction of rotation. In order to prevent the stalling of the engine, in the event that the controller be put into reverse position with the vehicle running forward, the machine B is connected so as to transmit torque from the driving shaft to the engine in the forward direction of rotation of the engine but it will not operate as a clutch when the engine is driven faster than the driving shaft in the forward direction, nor when the engine is driven in the forward direction and the driving shaft in the reverse direction. This prevents current from the machine C, which becomes a generator if driven in the forward direction, from driving the machine A backwards as a motor and thus stalling the engine, as with the engine stationary the forward driving effort from the shaft imposed upon the engine is greater than the reverse driving effort imposed upon the engine by the machine A for current derived from similar speed of the machine C acting as a generator. This means that it is possible to throw the controller lever into the reverse position while the vehicle is still moving forward, in which case there is a braking effort imposed upon the driving shaft, both from the machine C acting as a generator and from the machine B acting as a clutch generator with the driving effort of machine B tending to drive the engine in the forward direction, greater than the driving effort of machine A tending to drive it in the reverse direction. Thus without any driving effort derived from the engine itself, the engine will be kept running in a forward direction when the vehicle is moving in the forward direction. The vehicle thus come to rest with the braking and the reverse driving effort imposed upon its driving shaft without tending to stall the engine, or turn it backwards. In reverse the machine C acts as a motor and the machine B does not function as a clutch and opposes no resistance to the backward rotation of the driving shaft. The starting battery may if desired be included in circuit of the machine B, in which case it will keep the engine running forward at a still greater speed than that of the driving shaft alone.

Fig. 3 shows the position of cranking the engine through the use of the machine B with its armature and field connected in relation to turn the engine forward while at the same time machine C is shown with its armature and field connections such that it becomes a generator and an electric brake upon the driving shaft for forward direction of motion of the vehicle. In this position, machine A is ineffective.

Fig. 3ª shows a means of cranking the engine from the machine A. In this position both machines B and C may be ineffective, or machine C may be connected to act as a brake.

Fig. 4 shows the first speed position or maximum torque position of the controller. The machine B is connected so as to generate and act as a clutch when the engine is running faster than the driving shaft in the forward direction. The current of machine B passes through machine C causing it to act as a motor for forward direction of driving of the driving shaft. Machine A is also in circuit with machines B and C and is so connected as to act as a motor tending to help turn the engine crank shaft. As pointed out above, a maximum torque is obtained by means of this connection.

Fig. 5 shows machine B connected to act as a generator and as a clutch for transmitting torque from the engine to the driving shaft in the forward direction. Machine C is in series with machine B and acts as a motor to impose additional torque upon the driving shaft. Machine A is not in circuit for purposes of power transmission, but if desired may be used as a charging generator for the storage battery, preferably with a differentially connected shunt and series field.

Fig. 6 shows machines A, B and C connected in series to provide an intermediate multiplied torque less than that provided by the connections of Fig. 5. In Fig. 6 the torques of machines B and C are added but decreased by decreasing the current. This would result in a decreased output of the engine and a proportionately decreased speed of the shaft. In the connections of Fig. 6 the full output of the engine is utilized and transmitted at high shaft speed by including the machine A as a generator in the circuit, machine A being driven by the available power of the prime mover represented by the difference between the full power of the prime mover and that transmitted through the machine B. This position thus provides a means of securing a torque greater than the torque of the engine but less than the combined torque of the two machines B and C at full field strength and full current without weakening the field strength of machine C, but by decreasing the current through machines B and C, thus reducing the losses and heating incident to high current and improving the commutation.

Fig. 7 shows machine B connected so as to act as an electric clutch for transmitting driving effort from the engine to the driven shaft. It is shown short-circuited upon itself, to give the minimum loss in speed between the engine and the driving shaft and machine A is shown connected as a differential generator to charge the storage battery. It will be understood that machine C may be used as a differential generator to charge the storage battery, as shown in my prior patents referred to above, instead of machine A if desired, in which case machine A would be ineffective.

Fig. 8 shows machine B connected so as to transmit torque from the engine to the driving shaft in a forward direction and in circuit with machine A which is driven from the engine as a generator, furnishing electrical energy to machine B by means of which its armature connected to the driving shaft is driven forward and faster than its field, which is connected to the engine. The driving shaft is thus speeded up above the speed of the engine and the torque imposed upon the driving shaft is thus transmitted at a higher speed than engine speed and at a less torque than engine torque, by the amount necessary to drive the machine A. Machine C is not in the power circuit at this time and may be ineffective, or may be connected as a generator for charging the storage battery.

The combination of these three machines acts in the reverse position as a means of driving the driving shaft in opposite direction from the engine, without interposing the forward driving effort of the engine upon the driving shaft and provides a means by which forward direction of motion of the vehicle from this position will not react upon the engine to stall it.

The maximum torque position shown in Fig. 4 gives a greater maximum torque than could be obtained by the use of the two machines B and C combined with the same current.

Position 5 provides a means of increasing the torque of the driving shaft above that of the engine with a current flow in the circuit equal only to that necessary to transmit the engine torque, which is less than that of the total torque on the driving shaft.

The position shown in Fig. 8 provides a means of driving the driving shaft at a higher speed and less torque than that of the engine with a current in this circuit of the machine only sufficient for transmitting the shaft torque, which in this case, is less than the engine torque.

An increase of engine driving torque such as is obtained with Fig. 5 by the use of machines B and C, could be obtained by the use of machines A and C, in which case machine A would act as a generator, transmitting full engine torque at full engine speed, and machine C would act as a motor, transmitting full shaft torque to full shaft speed; or machines B and A could be used together, machine B acting as a clutch and generator, transmitting full shaft torque at a speed difference between its members equal to the speed between the shaft and engine, while the machine A would act as a motor at full engine speed transmitting a torque equal to the difference in torque between the engine and shaft. In either case, the output of the machines would be greater than in the method shown in Fig. 5, where neither machine transmits full shaft torque, nor runs at full engine speed.

The multiplication of shaft speed, shown in Fig. 8 may, if desired, be obtained by the use of machines B and C, with machine B acting to transmit full engine torque and with machine C acting as a generator taking torque from the driving shaft to the extent of the excess of engine torque and running at full shaft speed.

Also, machines A and C could be used for obtaining multiplied shaft speed, by having machine A act as a generator at engine speed at full engine torque and machine C acting as a motor at full shaft speed at shaft torque, in either case, requiring larger machines and in the case of Fig. 8 where neither machine runs at full engine torque or full shaft speed. In the apparatus of my invention, at the time when the shaft torque is at a maximum, and in excess of the engine torque, the torque is supplied by the two machines B and C jointly and the machine A, which is connected with the engine, is not in service for the purpose of power transmission and is thus prevented from operating at the maximum speed of the engine which obtains at this time. Also, when the speed of the shaft is at a maximum and its torque at a minimum as compared with the engine, the torque delivered by the machine B is that of the shaft and not the maximum engine torque, while its speed difference is the difference between the speed of the engine and the shaft, and the machine A is operating at the speed of the engine which is lower than that of the shaft and operating at a torque difference equal to that between the torque of the shaft and the torque of the engine.

It will be evident from the foregoing that many modifications of the specific apparatus shown and described may be made and I therefore do not intend to confine myself to said apparatus, which is shown and described in this specification as illustrative only.

It will be understood that my transmission device is supplied with a suitable controller for making the desired connections at the will of the operator, many examples of which will be found in the prior art, and that a storage battery of any suitable variety is also included in the system.

If it is desired to apply the claims appended hereto to the specific embodiment of the invention illustrated in the drawings, the "first dynamo electric machine" may be considered to be the dynamo electric machine B of the drawings, the "second dynamo electric machine" the machine C of the drawings and the "third dynamo electric machine" the machine A of the drawings. I do not however wish to limit the scope of my said claims to the specific arrangement of the machines illustrated.

I claim:

1. In a device for transmitting power from a prime mover to the driving shaft of a load the combination of three dynamo electric machines, the first having two rotatable elements, one of which is connected to the driving shaft and the other of which is connected to the prime mover, the second dynamo electric machine having one element connected to the driving shaft and one element stationary, and the third dynamo electric machine having one element stationary, and one element connected to the prime mover, and a controller having contacts and connections adapted to connect the third and first dynamo electric machines in series so that the third machine acts as a generator delivering current to the first machine so as to drive the element of the first machine, which is connected to the driving shaft at a speed greater than the speed of the prime mover, and adapted to connect the three machines in series so that the torques of the first and second machines are applied to the load, and the third machine acts as a generator to supply energy to the first and second machines to increase their speed.

2. In a device for transmitting power from a prime mover to a load, the combination of three dynamo electric machines, the first having two rotatable elements, one of which is connected to the driving shaft of the load and the other of which is connected to the prime mover, the second dynamo electric machine having one element connected to the driving shaft and one element stationary, and the third dynamo electric machine having one element stationary and one element connected to the prime mover, and a controller having contacts and connections adapted to connect the third and first dynamo electric machines in series so that the third machine acts as a generator delivering current to the first machine, so as to drive the element of the first machine, which is connected to the driving shaft, at a speed greater than the speed of the prime mover, and adapted to connect the first and second machines in series so as to add the torques of the first and second machines to drive the load.

3. In a device for transmitting power from a prime mover to a load a prime mover, three dynamo electric machines, one having two rotatable elements, one connected to the prime mover and one to the load, another having one element stationary and one element connected to the load and a third having one element stationary and one element rotatable by the prime mover, and a controller having contacts and connections arranged to connect the three machines in series whereby the torques of the first and second machines are added and delivered to the load and the third machine acts as a generator to deliver current to the first and second machines to increase their speed.

4. Means for transmitting power from a prime mover to a load comprising a prime mover, three dynamo electric machines, the first having two elements, one connected to the prime mover and one to the load, the second having a stationary element and a movable element connected to the load, and the third having a stationary element and a moving element connected to the prime mover, and a controller having contacts and connections adapted to alternatively connect the third dynamo electric machine in the system to act as a generator as a means for supplying energy to the armatures of the other two dynamo electric machines or to act as a motor to assist in driving the prime mover.

5. Means for transmitting power from a prime mover to a load comprising a prime mover, three dynamo electric machines, the first having two elements, one connected to the prime mover and one to the load, the second having a stationary element and a movable element connected to the load, and the third having a stationary element and a movable element connected to the prime mover, and a controller having contacts and connections arranged to connect the first and second machines in series to multiply the torques delivered to the load, to connect the first and third machines in series, to multiply the speed of the load and to short circuit the first machine on itself, to drive the load on substantially the torque of the prime mover.

6. Means for transmitting power from a prime mover to a load comprising a prime mover, three dynamo electric machines, the first having two elements, one connected to the prime mover and one to the load, the second machine having a stationary element and a movable element connected to the load, and the third having a stationary element and a movable element connected to the prime mover, and a controller having contacts and connections arranged whereby the first and second machines in combination transmit power at more than prime mover torque and at less than prime mover speed, whereby the first and third machines transmit power at greater than prime mover speed, and whereby the second and third machines in combination transmit power from the prime mover to the load in reverse direction of rotation.

7. In a device for transmitting power from a prime mover to a load, a prime mover, three dynamo electric machines, the first having two elements, one connected to the prime mover and one to the load, the second machine having a stationary element and a movable element connected to the load and the third machine having a stationary element and a movable element connected to the prime mover, and a controller having contacts and connections adapted to connect the second and third machines in combination to transmit the power from the prime mover to the load, in the reverse direction of rotation from the direction of rotation from the prime mover, the elements of the first machine at such time revolving in opposite directions.

8. In a device for transmitting power from a prime mover to a load, a prime mover, the combination of a prime mover and three dynamo electric machines adapted to transmit power to a driven shaft within a speed and torque range comprising higher torques and higher speeds than the torque and speed of the prime mover, and a controller having contacts and connections arranged to connect said dynamo electric machines so that when the torque of the shaft is greater than the torque of the prime mover, such torque is the sum of the torque of two of the machines, and when the speed of the shaft is greater than the speed of the prime mover, the torque exerted by any one of the machines is less than the torque of the prime mover.

9. In a device for transmitting power from a prime mover to a load, a prime mover, three dynamo electric machines, the first having two elements, one connected to the prime mover and one to the load, the second machine having a stationary element and a movable element connected to the load and the third machine having a stationary element and a movable element connected to the prime mover, and a controller having contacts and connections adapted to connect said machines to one another so that when the torque delivered to the load is less than that of the prime mover, the torque delivered is delivered by the first machine alone, the speed of the element of said first machine connected to the load being at such time in excess of the speed of the prime mover, and whereby the increased speed of the element of the first machine connected to the load results from the application of current to it generated by the third machine.

10. In a device for transmitting power from a prime mover to a load, a prime mover, three dynamo electric machines, the first having two elements, one connected to the prime mover and one to the load, the second machine having a stationary element and a movable element connected to the load and the third machine having a stationary element and a movable element connected to the prime mover, and a controller having contacts and connections adapted to connect the second machine as a motor to drive the load in the reverse direction from the direction of the rotation of the prime mover from current obtained from the third machine and simultaneously connecting the first machine to drive the prime mover in a forward direction when the load moves in the forward direction and to exert no driving effort on the driving shaft when the load moves in the reverse direction.

11. Means for transmitting the torque and speed of a prime mover to a driven shaft at speeds above the speed of the prime mover and at less than prime mover torque and at speeds below prime mover speed and torques greater than that of prime mover torque which comprises a prime mover, means for adding torque to the driven shaft by energy derived from speed losses between the prime mover and the shaft and for adding speed to the shaft by energy derived from torque taken directly from the prime mover.

12. Means for transmitting power from a prime mover to a load comprising a prime mover, three dynamo electric machines and a controller having contacts and connections adapted to connect two of said machines in series to deliver power to the load at speeds greater than prime mover speed and to connect another two of the machines to drive the load in the reverse direction of rotation from that of the prime mover by energy taken from the prime mover.

13. Means for transmitting power from a prime mover to a load comprising a prime mover, three dynamo electric machines and a controller having contacts and connections adapted to connect two of said machines in series to deliver power to the load at speeds greater than prime mover speed and to connect another two of the machines to drive the load in the reverse direction of rotation from that of the prime mover, one of the dynamo electric machines being at that time ineffective to deliver power, but adapted to drive the prime mover in a forward direction if the load moves in a forward direction.

14. In a device for transmitting power from a prime mover to a load the combination of a prime mover, three dynamo electric machines one of which transmits the torque of the prime mover shaft and at the same time generates current by reason of speed differences between its elements, means for delivering said current to a dynamo electric machine connected to the load and to a dynamo electric machine connected to the prime mover which adds forward torque upon the prime mover shaft in addition to the torque of the prime mover.

15. In a device for transmitting power from a prime mover to a load the combination of a prime mover, three dynamo electric machines the first having one element connected to the prime mover and one element to the load the second machine being connected to drive the load and the third machine being connected in circuit with the first and second machines to assist in driving the prime mover shaft and means for taking energy from the first machine and delivering it to the third machine.

In testimony whereof, I have signed my name to this specification this 9th day of April, 1923.

JUSTUS B. ENTZ.